United States Patent
Kuo

(10) Patent No.: US 9,377,592 B2
(45) Date of Patent: Jun. 28, 2016

(54) OPTICAL COUPLING ELEMENT AND OPTICAL-ELECTRICAL CONVERTING MODULE HAVING SAME

(71) Applicant: HON HAI PRECISION INDUSTRY CO., LTD., New Taipei (TW)

(72) Inventor: Chang-Wei Kuo, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 66 days.

(21) Appl. No.: 14/086,060

(22) Filed: Nov. 21, 2013

(65) Prior Publication Data

US 2015/0043868 A1 Feb. 12, 2015

(30) Foreign Application Priority Data

Aug. 7, 2013 (TW) .............................. 102128208 A

(51) Int. Cl.
*G02B 6/32* (2006.01)
*G02B 6/42* (2006.01)
(52) U.S. Cl.
CPC ............ *G02B 6/4204* (2013.01); *G02B 6/4214* (2013.01); *G02B 6/4292* (2013.01)

(58) Field of Classification Search
CPC ........ G02B 6/32; G02B 6/262; G02B 6/4203; G02B 6/4204; G02B 6/4206
USPC .......................................................... 385/33
See application file for complete search history.

(56) References Cited

U.S. PATENT DOCUMENTS 5,675,684 A * 10/1997 Hirataka ............... G02B 6/4232
385/88
2013/0287406 A1* 10/2013 Huang et al. .................. 398/139

* cited by examiner

*Primary Examiner* — Jerry Blevins
(74) *Attorney, Agent, or Firm* — ScienBiziP, P.C.

(57) ABSTRACT

An optical coupling element includes a main body, first and second converging lenses. The main body includes a first optical surface, a second optical surface perpendicular to the first optical surface, and a reflective surface tilted relative to the first and second optical surfaces. The main body defines positioning holes adjacent to the first optical surface, and avoiding grooves in sidewalls of the positioning holes and communicated with the positioning holes. The first converging lens is formed on the first optical surface. The second converging lens is formed on the second optical surface and corresponding to the first converging lens one by one. The first converging lens, the reflective surface, and the second converging lens cooperatively form an optical path.

8 Claims, 5 Drawing Sheets

OPTICAL COUPLING ELEMENT AND OPTICAL-ELECTRICAL CONVERTING MODULE HAVING SAME

BACKGROUND

1. Technical Field

The present disclosure relates to an optical coupling element and an optical-electrical converting module using the optical coupling element.

2. Description of Related Art

An optical-electrical converting module includes a printed circuit board (PCB) and a resin optical coupling element. Metal positioning rods are mounted on the PCB. The optical coupling element defines positioning holes. The positioning rods are tightly fitted in the positioning holes. The optical-electrical converting module must be heated in an oven during the manufacturing process. However, when heated, the metal positioning rods may expand and break positioning holes.

Therefore, it is desirable to provide an optical coupling element and an optical-electrical converting module which can overcome the shortcomings mentioned above.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
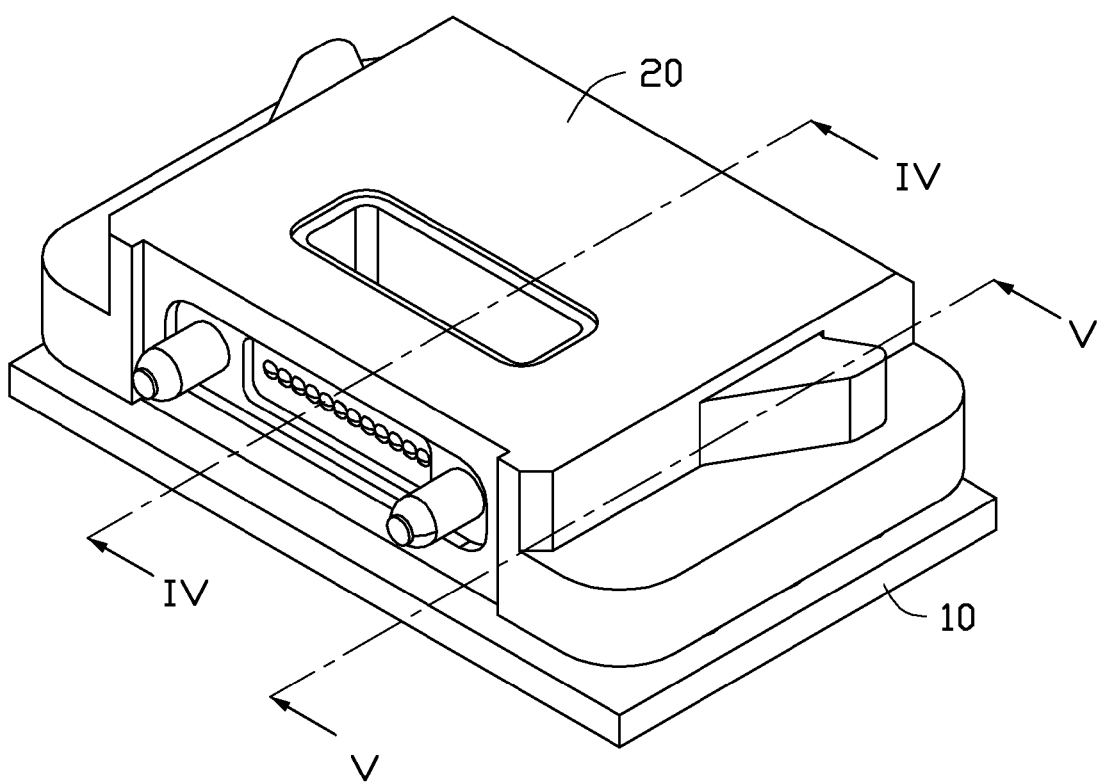
FIG. 1 is schematic, isometric view of an optical-electrical converting module according to an exemplary embodiment of the present disclosure.
Figure 2:
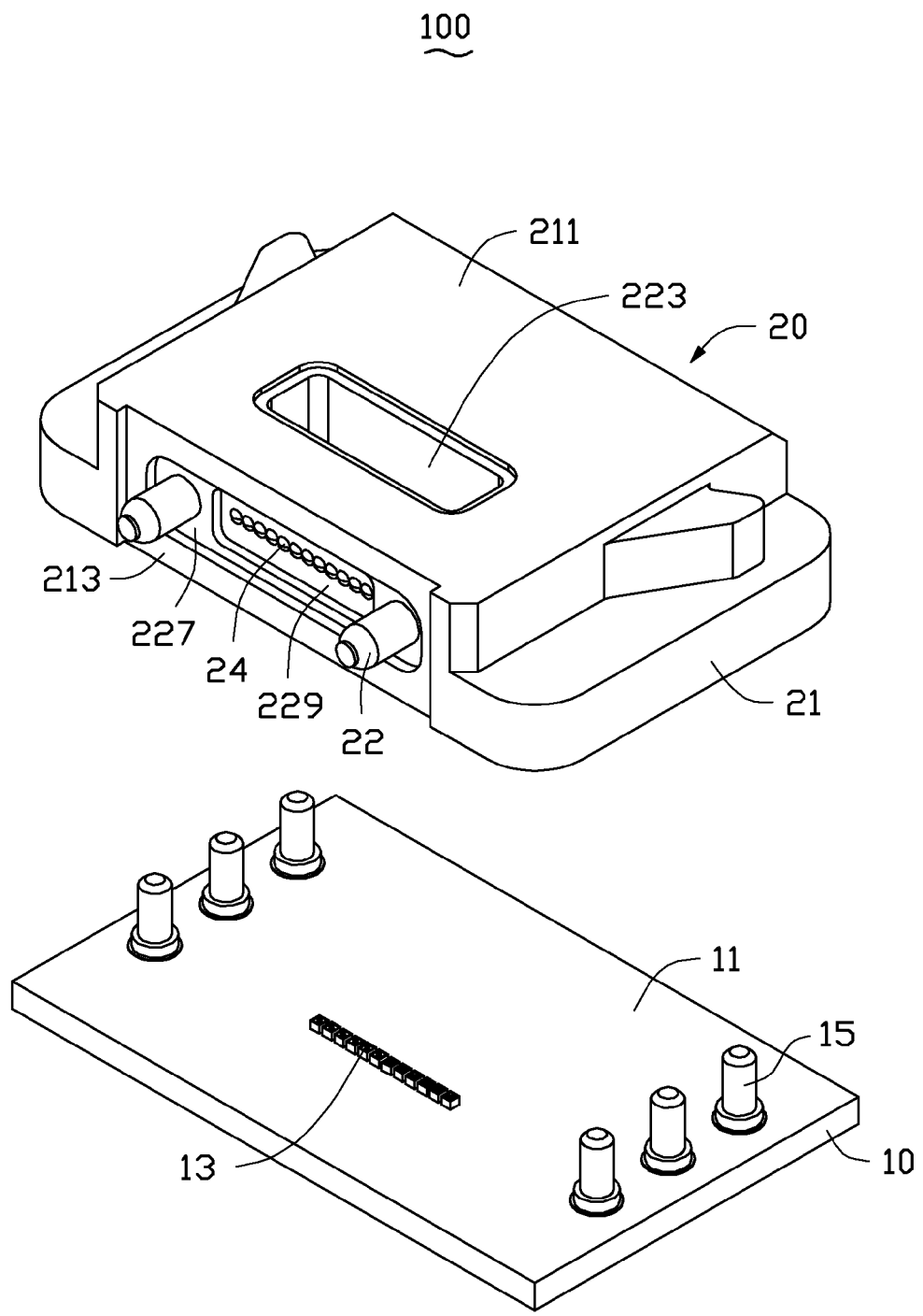
FIG. 2 is an exploded view of the optical-electrical converting module of FIG. 1.
Figure 3:
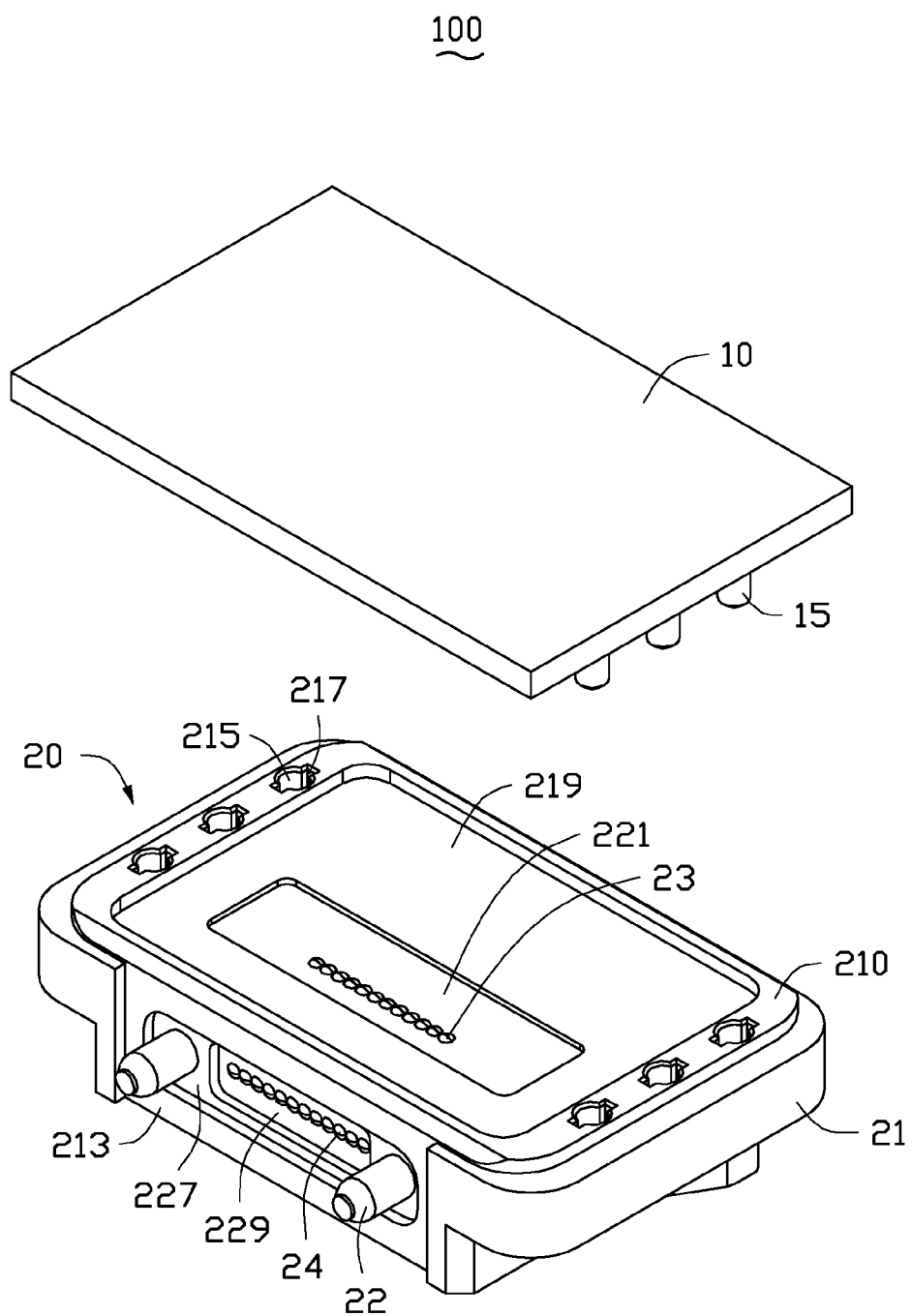
FIG. 3 is similar to FIG. 2, but viewed from another angle.
Figure 4:
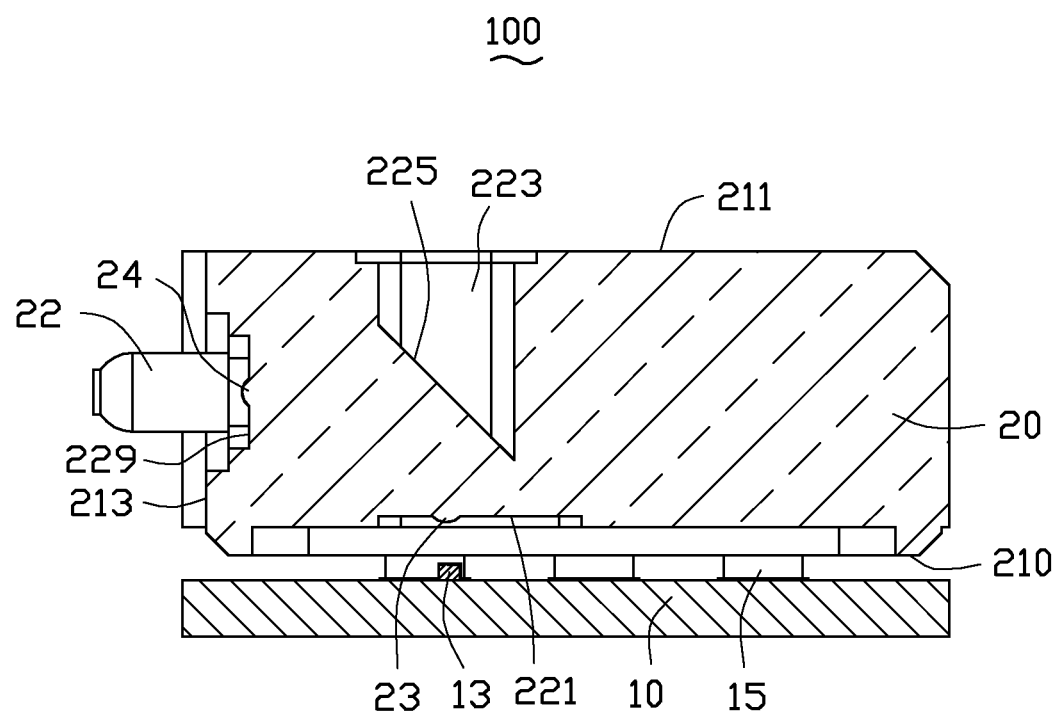
FIG. 4 is a cross-sectional view taken along IV-IV line of the optical-electrical converting module of FIG. 1.
Figure 5:
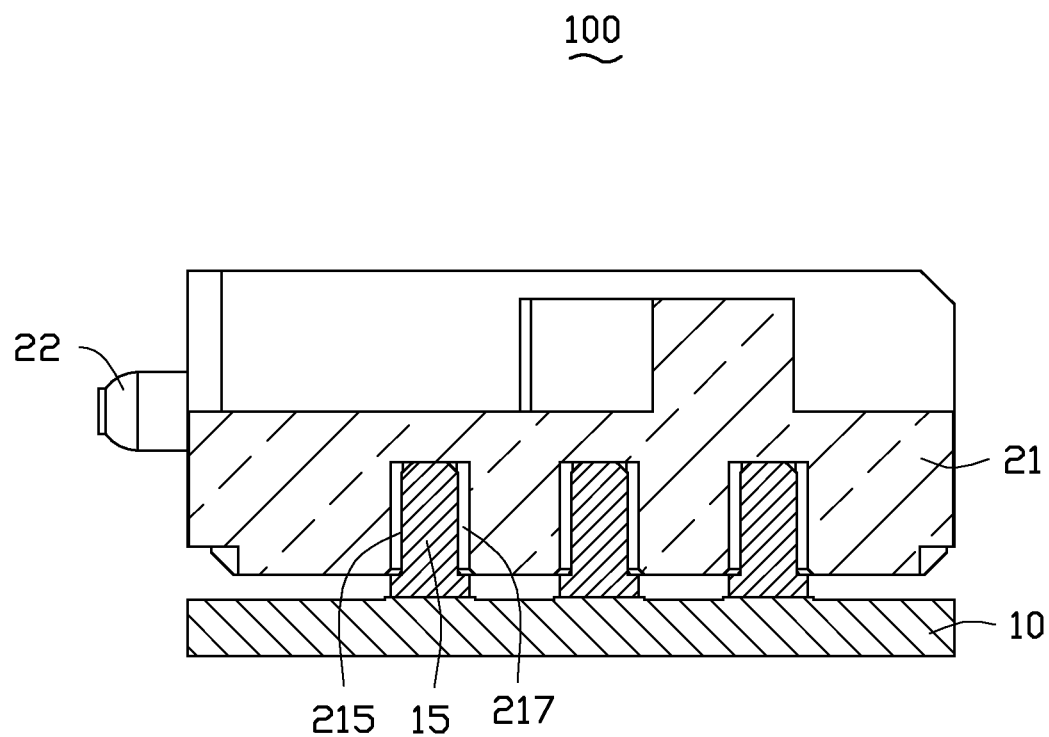
FIG. 5 is a cross-sectional view taken along V-V line of the optical-electrical converting module of FIG. 1.

FIGS. 1 to 5 show an optical-electrical converting module 100 of an illustrated embodiment. The optical-electrical converting module 100 includes a printed circuit board (PCB) 10 and an optical coupling element 20 mounted on the PCB 10.

The PCB 10 includes a loading surface 11. An array of optical-electrical converting elements 13 is mounted on the loading surface 11. The optical-electrical converting elements 13 can be photo diodes and/or laser diodes. Two arrays of first positioning rods 15 are mounted on the loading surface 11 adjacent to the optical-electrical converting elements 13. The first positioning rods 15 are made of metal. The first positioning rods 15 can be soldered to the loading surface 11 or can be inserted into holes defined in the PCB 10. A distributed direction of the array of the first positioning rods 15 is perpendicular to a distributed direction of the array of the optical-electrical converting elements 13.

The optical coupling element 20 is made of resin, and includes a main body 21, two second positioning rods 22, an array of first converging lenses 23, and an array of second converging lenses 24.

The main body 21 is a plate, and includes a bottom surface 210 adjacent to the loading surface 11, a top surface 211 opposite to the bottom surface 210, and a front surface 213 perpendicular to the bottom surface 210 and the top surface 211. The main body 21 defines two arrays of positioning holes 215 on the bottom surface 210. The positioning holes 215 correspond to the first positioning rods 15 one by one. The first positioning rods 15 are tightly fitted in the positioning holes 215. In this way, the optical coupling element 20 is mounted on the PCB 10. The main body 21 further defines avoiding grooves 217 on the bottom surface 210. The avoiding grooves 217 are defined in sidewalls of the positioning holes 215 and communicate with the positioning holes 215. A depth of the avoiding grooves 217 is equal to a depth of the positioning holes 215. When the first positioning rods 15 are heated and pressing the main body 21, the main body 21 can deform towards the avoiding grooves 217 to prevent the positioning holes 215 from being broken. In this embodiment, each positioning hole 215 communicates with two avoiding grooves 217. The two avoiding grooves 217 are symmetrical about a center of the positioning hole 215.

The main body 21 further defines a bottom groove 219 in the bottom surface 210 between the two arrays of positioning holes 215. The bottom groove 219 is a rectangular stepped groove. The main body 21 further includes a first optical surface 221 in the bottom groove 219 and parallel to the bottom surface 210. The first converging lenses 23 are formed on the first optical surface 221 and aligned with the optical-electrical converting elements 13.

The main body 21 further defines a top groove 219 in the top surface 211. The top groove 219 is rectangular. The main body 21 includes a reflective surface 225 in the top groove 219 and tilted relative to the top surface 211. The reflective surface 225 is opposite to the first optical surface 221 and tilted relative to the first optical surface 221. In this embodiment, an included angle between the reflective surface 225 and the first optical surface 221 is about 45 degrees.

The main body 21 further defines a front groove 227 in the front surface 213. The front groove 227 is a rectangular stepped groove. The main body 21 further includes a second optical surface 229 in the front groove 227 and parallel to the front surface 213. The second optical surface 229 is opposite to the reflective surface 225 and tilted relative to the reflective surface 225. In this embodiment, an included angle between the second optical surface 229 and the reflective surface 225 is about 45 degrees. The second converging lenses 25 are formed on the second optical surface 229 and correspond to the first converging lenses 23 one by one. In this embodiment, the first and second converging lenses 23, 24 are convex lenses.

The second positioning rods 22 are received in the front groove 227 adjacent to the second optical converging lenses 24. The second positioning rods 22 are perpendicular to the front surface 213. The second positioning rods 22 are used to connect the optical-electrical converting module 100 to an optical fiber connector (not shown).

In this embodiment, the main body 21, the second positioning rods 22, the first converging lenses 23, and the second converging lenses 24 are integrally formed by an inject molding method.

When working, if the optical-electrical converting elements 13 include photo diodes, the first optical signals from the optical fiber connector are converged by the second converging lenses 24 entering the optical coupling element 20. In addition, the first optical signals are reflected to the first converging lenses 23 by the reflective surface 225, finally reach the photo diodes, the photo diodes convert the first optical signals into first electrical signals.

If the optical-electrical converting elements 13 include laser diodes, the laser diodes convert second electrical signals into second optical signals. The second optical signals are converged by the first converging lenses 23 and enter the optical coupling element 20, and then are reflected to the second converging lenses 24, finally are emitted out of the optical coupling element 20 from the second converging lenses 24.

The optical coupling element 20 defines avoiding grooves 217 communicating with the positioning holes 215, when the first positioning rods 15 are heated and pressing the main body 21, the main body 21 can deforms towards the avoiding grooves 217 to avoid the positioning holes 215 being broken.

It will be understood that the above particular embodiments are shown and described by way of illustration only. The principles and the features of the present disclosure may be employed in various and numerous embodiments thereof without departing from the scope of the disclosure. The above-described embodiments illustrate the scope of the disclosure but do not restrict the scope of the disclosure.

What is claimed is:

1. An optical coupling element comprising:
    a main body comprising:
        a first optical surface;
        a second optical surface perpendicular to the first optical surface; and
        a reflective surface tilted relative to the first and second optical surfaces, wherein the main body defines positioning holes adjacent to the first optical surface and avoiding grooves in sidewalls of the positioning holes and communicated with the positioning holes;
    at least one first converging lens formed on the first optical surface; and
    at least one second converging lens formed on the second optical surface and corresponding to the first converging lens one by one, the first converging lens, the reflective surface, and the second converging lens cooperatively forming an optical path;
    wherein each positioning hole are communicated with two of the avoiding grooves and each two avoiding grooves are symmetrical about a center of the positioning hole.

2. The optical coupling element of claim 1, wherein the main body further comprises a bottom surface, a top surface opposite to the bottom surface, and a front surface perpendicular to the bottom surface and the top surface, the main body further defines a bottom groove in the bottom surface, a top groove in the top surface, and a front groove in the front surface, the first optical surface is in the bottom groove, the reflective surface is in the top surface, and the second optical surface is in the front surface, the positioning holes and the avoiding grooves are defined in the bottom surface.

3. The optical coupling element of claim 2, further comprising positioning rods extending from the main body in the front groove and perpendicular to the front surface.

4. The optical coupling element of claim 1, wherein an included angle between the first optical surface and the reflective surface and an included angle between the second optical surface and the reflective surface both are substantially 45 degrees.

5. An optical-electrical converting module comprising:
    a printed circuit board (PCB);
    at least one optical-electrical converting element mounted on the PCB;
    first positioning rods made of metal and mounted on the PCB; and
    an optical coupling element made of resin, comprising:
        a main body comprising:
            a first optical surface;
            a second optical surface perpendicular to the first optical surface; and
            a reflective surface tilted relative to the first and second optical surfaces, wherein the main body defines positioning holes adjacent to the first optical surface and avoiding grooves in sidewalls of the positioning holes and communicated with the positioning holes, the first positioning rods are tightly fitted in the positioning holes;
        at least one first converging lens formed on the first optical surface and aligned with the optical-electrical converting element; and
        at least one second converging lens formed on the second optical surface and corresponding to the first converging lens one by one, the optical-electrical converting element, the first converging lens, the reflective surface, and the second converging lens cooperatively forming an optical path;
    wherein each positioning hole are communicated with two of the avoiding grooves and each two avoiding grooves are symmetrical about a center of the positioning hole.

6. The optical-electrical converting module of claim 5, wherein the main body further comprises a bottom surface, a top surface opposite to the bottom surface, and a front surface perpendicular to the bottom surface and the top surface, the main body further defines a bottom groove in the bottom surface, a top groove in the top surface, and a front groove in the front surface, the first optical surface is in the bottom groove, the reflective surface is in the top surface, and the second optical surface is in the front surface, the positioning holes and the avoiding grooves are defined in the bottom surface.

7. The optical-electrical converting module of claim 6, further comprising positioning rods extending from the main body in the front groove and perpendicular to the front surface.

8. The optical-electrical converting module of claim 5, wherein an included angle between the first optical surface and the reflective surface and an included angle between the second optical surface and the reflective surface both are substantially 45 degrees.

* * * * *